United States Patent [19]

Lagieski et al.

[11] Patent Number: 4,811,445
[45] Date of Patent: Mar. 14, 1989

[54] ORAL HYGIENE SYSTEM

[76] Inventors: Daniel P. Lagieski, 1664 Bollum La., Long Lake, Minn. 55356; Todd B. Thompson, 4280 Jefferson St., Excelsior, Minn. 55331

[21] Appl. No.: 147,370
[22] Filed: Jan. 25, 1988
[51] Int. Cl.⁴ ............................................. A46B 9/04
[52] U.S. Cl. ..................... 15/104.94; 15/167.1; 15/176.6; 403/361; 206/209.1; 206/362.2
[58] Field of Search ............... 15/104.94, 167.1, 176, 15/145, 184; 403/360, 361, 334; 206/209.1, 362.2, 362.3, 362.4; 132/84 R

[56] References Cited

U.S. PATENT DOCUMENTS

| 655,251 | 8/1900 | Lay | 15/145 |
| 958,109 | 4/1904 | Sandiford | 15/167.1 |
| 2,130,661 | 9/1938 | Zaebst | 15/167.1 |
| 2,159,914 | 5/1939 | Tweedale | 15/176 |
| 3,369,265 | 2/1968 | Halberstadt et al. | 15/145 |
| 4,198,171 | 4/1980 | Lampka et al. | 15/184 |
| 4,362,174 | 12/1982 | Baker et al. | 15/176 |
| 4,683,604 | 8/1987 | Rueb | 15/176 |

FOREIGN PATENT DOCUMENTS

| 2337972 | 2/1975 | Fed. Rep. of Germany | 15/104.94 |
| 459141 | 8/1950 | Italy | 15/184 |
| 1091550 | 11/1967 | United Kingdom | 15/104.94 |

Primary Examiner—Peter Feldman
Attorney, Agent, or Firm—Harold D. Jastram

[57] ABSTRACT

An oral hygiene system including an aseptic container enclosing a disposable dental hygiene head having a socket for receiving a detachable handle having a male extension for penetrating the aseptic container to engage the socket of the head. The socket and male extension forming a fit which prevents rotation between the handle and head.

15 Claims, 2 Drawing Sheets

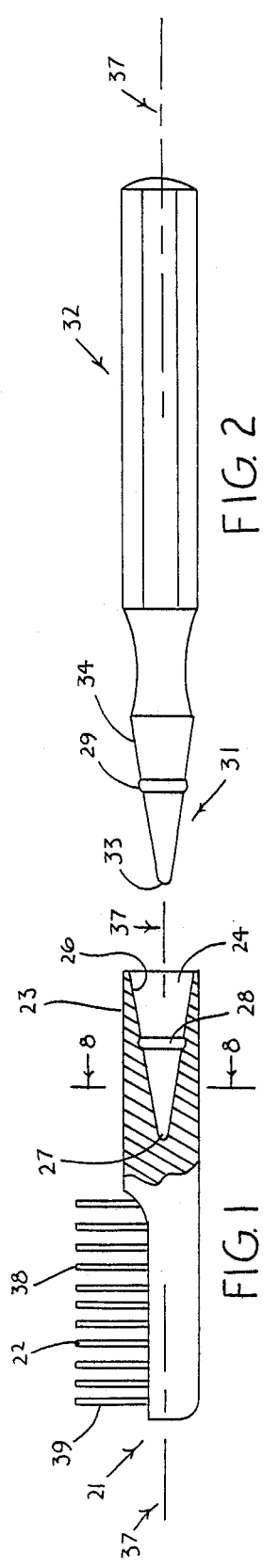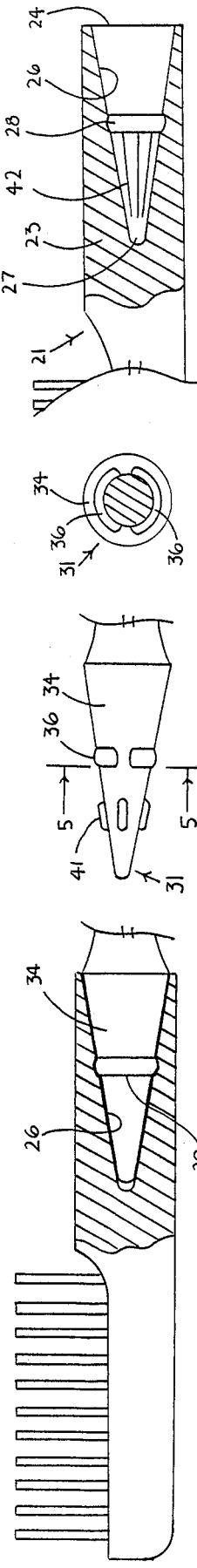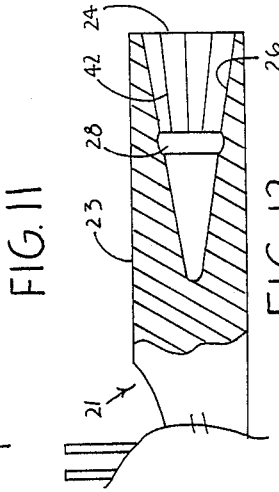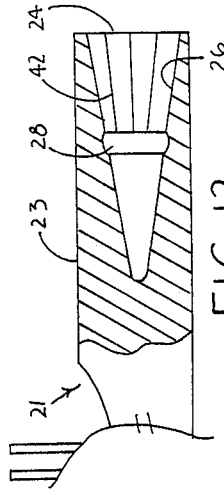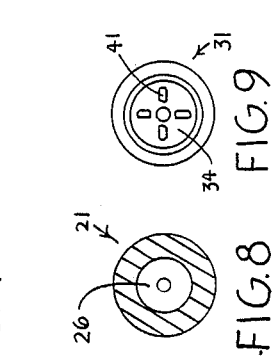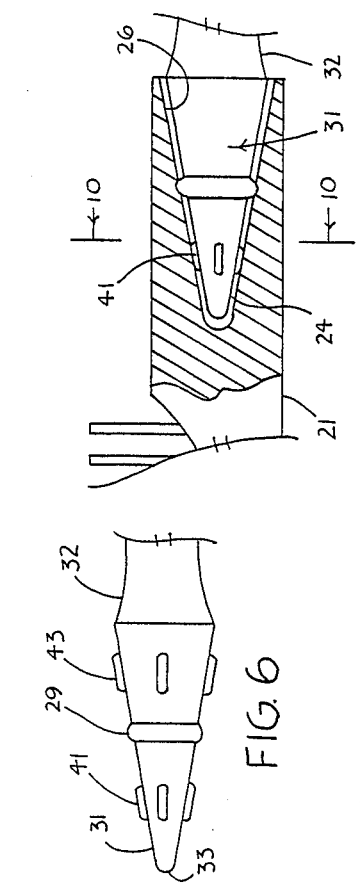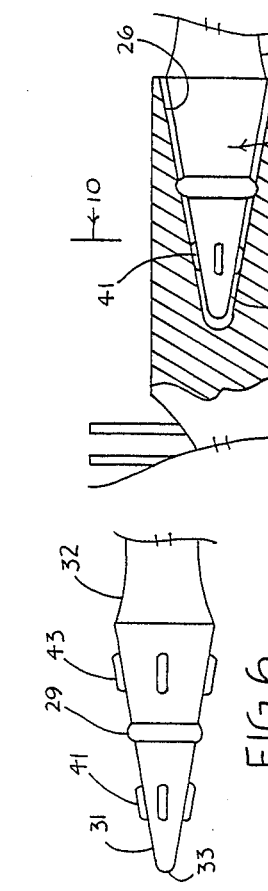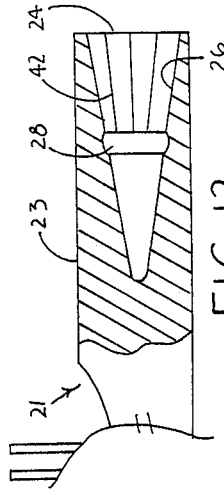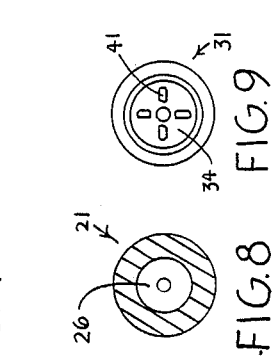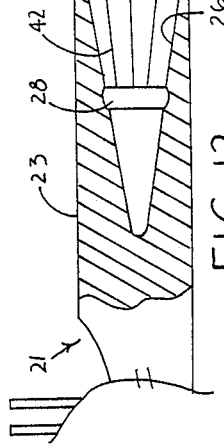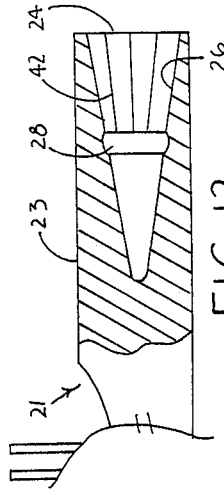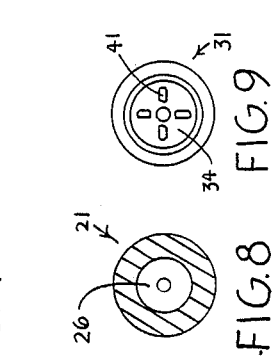

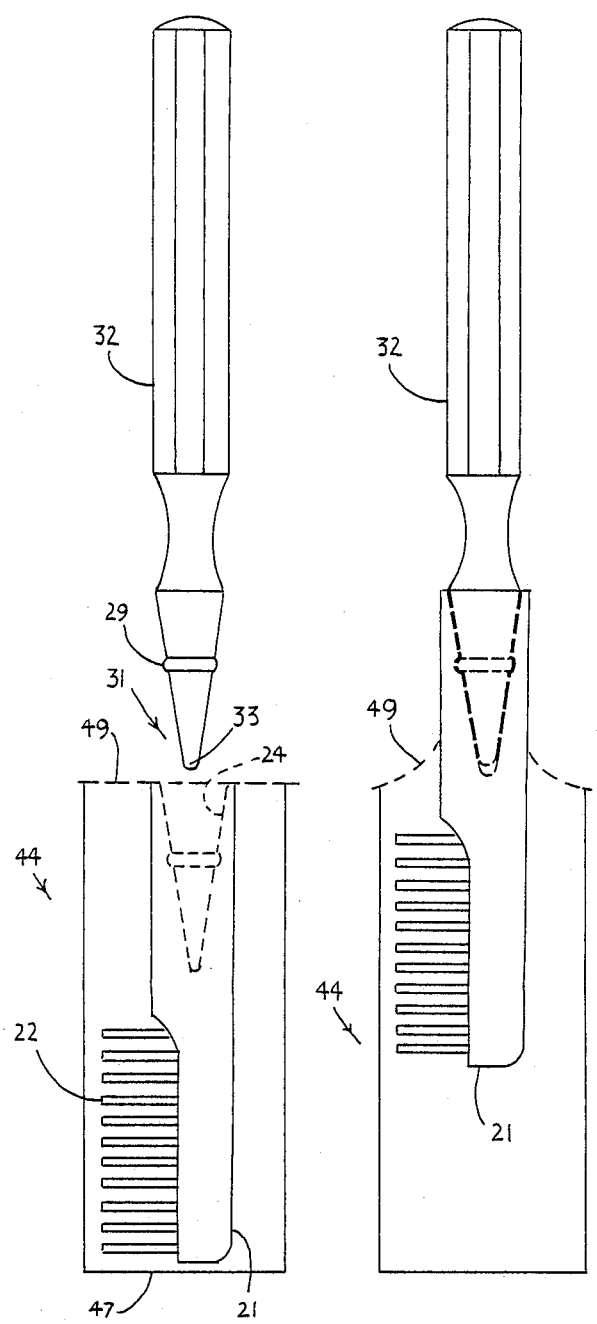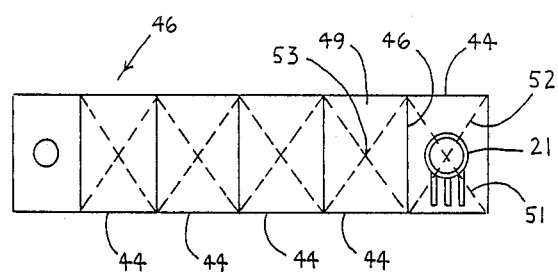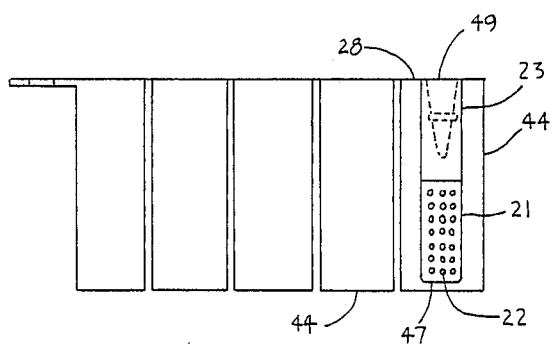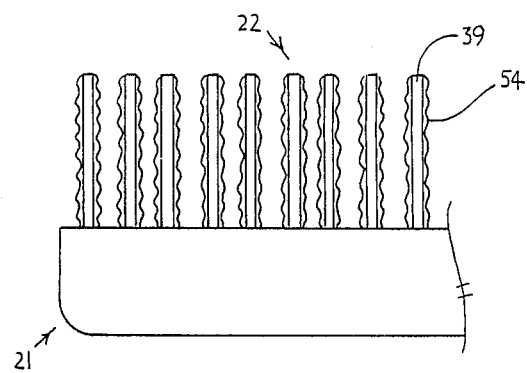

ORAL HYGIENE SYSTEM

BACKGROUND OF THE INVENTION

Medical authorities have learned the value of a continuous and thorough dental hygiene program for the prevention of dental carries, periodontal diseases and deterioration of tooth surfaces caused by bacterial infection in the mouth. It has been recently learned that cavities are developed in teeth as a result of chemical reaction with the tooth surface caused by bacteria constantly present in the mouth. The bacteria produce acids and similar toxins which attack the surface of the teeth and dissolve the surfaces thus producing cavities which must be repaired in order to save the tooth.

Plaque forms on tooth surfaces above and below the gums. The plaque acts as a harbor for bacteria and also tends to loosen the gums from the tooth surface and cause periodontal diseases. If this bacterial action and formation of plaque is not interrupted, the periodontal disease which develops will frequently result in loss of the teeth due to loosening from the bone structure in which the tooth is anchored.

Dentists have long recommended a combined program of flossing the teeth and brushing teeth in order to disturb and remove the formation of plaque and other tooth decay agents which form in the mouth. It is now generally recognized that it is desirable to remove as much bacterial plaque as possible from the interproximal spaces and from beneath the free gingival margin as well as from the surfaces of the teeth. A recommended program is to interrupt the formation of plaque during any given twenty-four hour period by isolating and disturbing the bacteria growth. The disturbance of the plaque formed on the teeth and the breakup of bacteria groups tend to reduce the damage which is done to the teeth by the bacterial action.

A good home dental program requires the use of a toothbrush of good design. The patient frequently will be advised by a dentist to use a brush which gives maximum cleansing action to the gingival area at one time of the day and may recommend the use of a different brush such as one which will effectively clean the interproximal areas at another time during the day in the dental hygiene program.

Since medical authorities have learned that tooth decay and periodontal diseases may be affected by bacterial action, they have come to recognize the need for destroying these bacteria colonies which form on the tooth surfaces. While it is recognized that it is not possible currently to completely remove the bacteria from the mouth, it is possible through an effective home cleansing program to reduce the effect of the bacterial action to a minimum. The primary function of the toothbrush is to destroy colonies of bacteria and remove plaque so that there will be no buildup in the concentration of plaque and bacteria concentrations which will attack the various structures of a patient's mouth.

Once medical authorities recognized the bacterial nature of disease which damage the teeth, it became apparent that the toothbrush which a patient uses in a routine program of dental cleanliness is itself a potential source of reinfection of the mouth. Authorities have learned that the toothbrush itself is a notoriously septic instrument. Microscopic particles or larger particles frequently become lodged in the bristles where they reenter the mouth on the next brushing of the teeth. Further, depending upon the frequency of brushing, the bristles may tend to remain septicly moist for long periods of time at normal room temperatures. Often the bristles will remain moist until the next use of the brush. This repeated use of septic brushes and brushes which are thoroughly contaminated with dangerous bacterial infections simply results in reinfection of the mouth by the very bacteria which produce diseases.

Various techniques have been suggested in order to avoid the septic conditions encountered by a frequent user of toothbrushes in a proper home dental program. One such solution is to rigorously flush the bristles of the toothbrush before and after each use to remove contaminating particles and bacteria colonies. Another technique has been to recommend the use of multiple toothbrushes so that a brush is permitted to become thoroughly dry prior to the next succeeding use of the brush.

Medical authorities also have confirmed that the toothbrush used by a sick patient can also harbor bacteria which are responsible for sore throats and other oral infections. A warm steamy bathroom is the perfect environment for the growth of such organisms. When the gums are cut or bruised during brushing, the bacteria responsible for such sore throats can reenter the blood stream or respiratory system, and consequently, prolong an infection which would otherwise have had a rather short duration of infection of the user of the brush. Some authorities recommend that in order to avoid such reinfection, that users discard toothbrushes every two weeks since it has been found that it takes less than three weeks for bacteria to heavily infect the bristles of brushes in constant use in warm environments.

Further, dentists have learned that depending upon the shape of a patient's teeth, the arrangement of those teeth and the structures of the mouth, different brushes having different characteristics will be recommended from time to time in a well-balanced home dental program.

The goal of an effective home program is to encourage frequent and routine use of toothbrushes. In order to encourage an effective program of this type, there have been provided disposable units which are proposed for such programs. These prior art disposable units, however, have had several serious disadvantages which have not been addressed effectively. First, the reusable portion of the unit frequently becomes contaminated and septic in the same fashion as the bristles of the brush. Such contamination causes the reinfection which is to be avoided in such disposable units.

These prior art disposable units were not of the type which were conveniently cleaned and made aseptic. Such units were not the type which might be used for travelers in a convenient fashion.

Further, dentists have learned through tests that many of the toothbrushes purchased new from stores are themselves contaminated with a variety of bacteria which infect the patient's mouth immediately upon use. Consequently, purchase of a new toothbrush in order to avoid bacterial infection of the oral cavities does not itself insure effective dental hygiene program.

SUMMARY OF THE INVENTION

It is, therefore, an object of the present invention to provide an oral hygiene system which is aseptic and reusable.

Another object of the present invention is to provide an oral hygiene system which provides for aseptic and disposable heads which can be used to reduce or eliminate the reinfection of oral cavities by bacteria clinging to bristles.

Another object of the present invention is to provide a convenient and effective oral hygiene system using disposable brushes which are aseptically packaged and are not contaminated by handling of the brush by human hands in order to avoid bacterial contamination of the brush as it is used in a program of oral hygiene.

It is a further object of the present invention to provide an oral hygiene system which utilizes a reusable handle which can be effectively cleaned to prevent septic contamination by bacteria.

Another object of the present invention is to provide a dental hygiene system which includes a reusable and cleanable handle adapted to engage a disposable head packaged in an aseptic package.

A further object of the present invention is to provide a dental hygiene device which has a reusable and cleanable handle which will prevent bacterial contamination of the device in combination with a disposable head unit which is discarded after each use in order to prevent recontamination of the mouth by the user.

Other objects and advantages of the oral hygiene system and device, according to the present invention, will be apparent by a reference to the drawings.

DRAWINGS

FIG. 1 of the drawings is a plan view of a disposable toothbrush head partially in cross-section in accordance with the present invention;

FIG. 2 is a plan view of a handle of a toothbrush according to the present invention adapted to engage the head illustrated in FIG. 1 of the drawings;

FIG. 3 is a plan view of a toothbrush head in accordance with the present invention showing a detachable handle partly in cross-section engaging the toothbrush FIG. 4 is a plan view of a male extension used on a handle illustrated in FIG. 2 of the drawings;

FIG. 5 is a cross-sectional view taken along line 5—5 of FIG. 4;

FIG. 6 is an alternate embodiment of a male extension illustrated in FIG. 4 of the drawings;

FIG. 7 of the drawings is a cross-sectional view of a head illustrated in FIG. 1 of the drawings shown in engagement with a male extension shown in FIG. 4 of the drawings;

FIG. 8 is a cross-sectional view taken along line 8—8 of FIG. 1 of the drawings;

FIG. 9 is a right-end view of the male extension illustrated in FIG. 4 of the drawings;

FIG. 10 is a cross-sectional view taken along line 10—10 of FIG. 7 of the drawings;

FIG. 11 is an alternate embodiment of the invention illustrated in FIG. 1 showing a socket having serrations;

FIG. 12 is an alternate embodiment of the invention showing a socket similar to FIG. 11 of the drawings;

FIG. 13 is an alternate embodiment of the head illustrated in FIG. 1 of the drawings;

FIG. 14 is an illustration of a dental oral hygiene system according to the present invention;

FIG. 15 of the drawings is an illustration of a dental oral hygiene system according to the present invention with a handle engaging a head being removed from an aseptic package;

FIG. 16 is a top view of a series of aseptic packages containing a head;

FIG. 17 is a front view of a series of aseptic packages for containing a head; and FIG. 18 is a fractional view of a head illustrating the bristles of a toothbrush coated with a dentifrice.

DETAILED DESCRIPTION OF THE INVENTION

Refer first to FIGS. 1 and 2 of the drawings. FIG. 1 of the drawings illustrates an oral hygiene applicator or head 21. This applicator 21 includes a brush 22 which is used to apply a dentifrice to teeth to remove plaque, imbedded food particles and similar material from the tooth surface. At the end of applicator 21 opposite brush 22 is an end portion 23 which has a socket or female receptor 24. The socket 24 has tapered walls 26 which verge to a point or apex 27. The shape of socket 24 can take a variety of shapes, including that of a hexagonal pyramid, an octagonal pyramid or the like. Preferably, however, socket 24 is essentially a cone.

Socket 24 also has an annular groove 28 located between the base of the socket and the apex 27. This annular groove is adapted to engage an annular projection 29 which is located on male extension 31 of handle 32. See FIG. 2 of the drawings. Male extension 31 is shaped so that it can be accommodated by socket 24 to form a tight, friction fit when male extension 31 is inserted into socket 24 of head 21. If socket 24 is an octagonal pyramid, then male extension 31 should also preferably be an octagonal extension or take a shape which can be accommodated by socket 24. Again, it is noted that preferably male extension 31 is a cone with an apex or point 33 which will securely fit inside socket 24 and be locked in place with annular projection 29 securely locked in annular groove 28. This locking fit is illustrated in FIG. 3 of the drawings.

If male extension 31 is a conical shape, then the male extension 31 is best designed so that it forms a tight friction fit within socket 24 with the outside surface 34 of male extension 31 contacting walls 26 of socket 24 to form a friction fit. When head 21 is securely engaged by handle 32, the entire unit forms a dental hygiene device which in the form illustrated in FIG. 3 is a toothbrush.

Reference to FIG. 8 of the drawings illustrates a cross-section of head 21 taken along line 8—8 of FIG. 1 of the drawings. FIG. 8 will reveal that the inside surface 26 of the preferred cone-shaped socket 24 is a relatively smooth cone.

The annular projection 29 on male extension 31 securely engages annular groove 28 of the head 21 so that the units are securely locked together along a longitudinal axis 37 of the handle 32 and head 21. Preferably, the annular projection 29 totally encompasses the male extension 31 to provide a secure locking fit in groove 28. An alternate embodiment, however, which will provide satisfactory results, is illustrated in FIGS. 4 and 5 of the drawings. In those Figures, the projection is not a completely annular projection but is rather a segmented projection 36. Projections 36 engage annular groove 28 in the same way that annular projection 29 engages and locks into groove 28. There is essentially no difference in the function except that the segmented projections 36 provide less locking surface. These segmented projections 36 nevertheless operate satisfactorily and under certain manufacturing conditions may be preferable.

FIG. 5 illustrates a male extension 31 which illustrates only two segmented projections 36, however, there may be even larger numbers of such projections about the surface 34 of the male extension 31. During the use of a dental hygiene device such as a toothbrush, the device will frequently be manipulated in many ways to place pressure on the joined unit including the handle 34 and head 21. For instance, as teeth are being brushed, there will be longitudinal pressure exerted along the longitudinal axes of the handle 32 and the head 21. The lock between annular projection 29 and annular groove 28 prevents separation of the head 21 from handle 32. There is also rotational force applied to the head 21 as the brush is used in a brushing motion which is essentially perpendicular to the longitudinal axes 37. Since force is being applied to the ends 38 of the bristles 39, the force will tend to rotate head 21 around longitudinal axes 37 and apply rotational pressure to the joint between male extension 31 and socket 24.

Where a conical male extension 11 is utilized, a close friction fit is relied upon to prevent the head 21 from rotating on the male extension 31. Greater control over this rotational force can be achieved if the male extension 31 is a hexagonal or octagonal cone and if the socket 24 is a matching hexagonal or octagonal socket. These are acceptable alternatives for the present invention; however, in practice they provide certain practical manufacturing difficulties. To overcome these problems, fins 41 are applied to the surface 34 of male extension 31 in order to increase the frictional fit between the male extension 31 and the wall 26 of socket 24. These fins 41 are illustrated in FIGS. 4 and 9 of the drawings where the male extension 31 is illustrated with four fins 41 evenly placed around the circumference of surface 34.

Fins 41 provide a means for securing the male extension 31 in socket 24 by providing a positive force fitting between the fins 41 and the wall 26 of socket 24. Where wall 26 is a smooth surface, fins 21 act as friction points for engaging the wall 26 and thereby increasing the friction fit between the head 21 and handle 32 sufficiently to prevent rotation of head 2 around longitudinal axis 37 during use of the device.

FIG. 7 of the drawings illustrates male extension 31 firmly connected to head 21 with fins 41 engaging the walls 26 of socket 24.

In order to further enhance the friction fit between fins 41 and wall 26, the wall 26 can be modified in order to increase the frictional fit. This modification of wall 26 is illustrated in FIG. 10 of the drawings in which wall 26 is shown with serrations 42. In this embodiment of the invention, fins 41 engage serrations 42 and form not only a frictional fit with the wall 26 but also form a positive connection between the wall surface through the use of serrations 42 into which the fins 41 are fitted. This provides a positive connection between male extension 31 and the end portion 23 of head 21.

Refer next to FIG. 6 of the drawings where a male extension 31 is illustrated having fins 41 which are between the apex 33 and the annular projection 29. Additional fins 43 are positioned beyond the projection 29 for additional frictional contact with the inside wall 26 of socket 24.

FIGS. 11, 12 and 13 illustrate alternate embodiments of head 21 which illustrates an end portion 23 having socket 24 configured with walls 26 with serrations 42 positioned at different locations along the walls 26. In FIG. 11 of the drawings, it is noted that serrations 42 are located in socket 24 between annular groove 28 and apex 27 of socket 24.

FIG. 12 of the drawings illustrates an end portion 23 where serrations 42 are located beyond annular groove 28 and in the portion of wall 26 between the opening to socket 24 and the annular groove 28.

FIG. 13 illustrates yet another embodiment of the invention where socket 24 has walls 26 with serrations 42 that extend the entire length of the walled surface 26 from the base of the socket or the opening of the socket 24 to the apex 27.

The variation of male extension 31 illustrated in FIG. 6 of the drawings would be used in connection with an end portion 23 which is illustrated in either FIG. 12 or FIG. 13 of the drawings. Fin 43 would contact the serrations 42 which are beyond the venular groove 28 and nearer the handle end of the socket 24. In each case, the serrations 42 function exactly the same to engage fins 41 and 43 to provide a positive fit between the male extension 31 and socket 24 to prevent rotation of head 21 about longitudinal axes 37 when the head 21 is positioned on the handle 32.

Refer next to FIGS. 16 and 17 of the drawings which illustrates a series of aseptic containers 44 which are connected along line 46 to form a package of containers 44 which includes five separate aseptic containers 44. Each aseptic container 44 is a separate package designed to accommodate a head 21. The head 21 illustrated in FIGS. 16 and 17 of the drawings is a toothbrush head. The head 21 is packaged in container 44 with the brush 22 positioned nearest the bottom 47 of the container 44. The end portion 23 is positioned near the top 48 of the container 44.

Container 44 can be constructed of a variety of materials however, a preferable material is simply a molded plastic container which is commonly used to package a variety of products. A requirement of the package 44, however, is that it be impermeable to contamination since container 44 is preferably an aseptic container for protecting the head 21 from contamination by bacteria, dirt and other contaminants.

After head 21 is loaded in container 44, a cover or seal 49 is placed over the opening to the container 44 to completely seal the head 21 within the container 44. The seal or cover 49 should be constructed of a plastic material which is strong enough to provide a secure package and yet strong enough to be scored along scoreline 51 to weaken the cover 49 sufficiently to permit access to head 21. FIG. 16 of the drawings illustrates a scoreline 51 and a second score 52 which intersect at a position generally over the head 21. Scoreline 51 and score 52 intersect to weaken the plastic cover 49 at the intersection 53 of the scores in order to permit a pointed male extension 31 to penetrate the cover 49 and permit male extension 31 to be inserted into socket 24 of head 21.

The operation of this dental hygiene system is illustrated in FIGS. 14 and 15 of the drawings. In FIG. 14 of the drawings, handle 32 is positioned above container 44 with the pointed male extension 31 directed at scored cover 49 of container 44. The handle 32 is thrust downwardly as viewed in FIG. 14 of the drawings and forced into engagement with head 21 as previously described. When handle 32 is forced downwardly as viewed in FIG. 14 of the drawings, the apex 33 of male extension 31 is sufficiently pointed so that it penetrates cover 42 which has been weakened along scorelines 51 and 52. The point 33 penetrates cover 49 and engages head 21 in socket 24. After projection 29 has engaged annular groove 28, the handle 32 is then reversed in direction and the head 21 is extracted from the aseptic container 44 through the now perforated cover 49 which permits extraction of the head 21 from the aseptic package 44. This extraction of head 21 from the container 44 is illustrated in FIG. 15 of the drawings where head 21 is shown partially removed from the aseptic container 44 and with the cover 49 distorted by the removal of head 21.

It will be apparent from the foregoing description that head 21 can be packaged aseptically in container 44 with a sterile cover 49 which will keep the head 21 in an aseptic condition until use by the user of the brush or head 21. It is also apparent from the foregoing description that the head 21 can be attached to the handle 32 without ever touching head 21 with the hands or other instruments which might contaminate head 21. It is apparent then from this description that this oral hygiene system provides a means for providing aseptically packaged toothbrushes which are capable of lengthy storage in a sterile condition. Such aseptic packaging and storage of toothbrush heads 21 will permit users to undertake an oral hygiene program which will permit brushing of the teeth with sterile brushes which do not harbor bacteria and other contaminants. Further, it will be apparent that since the head 21 is a disposable unit and is designed to be disposed after each oral hygiene session, the bacteria that frequently flourish in the moist environment encountered in most toothbrushes will be avoided. The used head 21 may simply be discarded and thereby totally avoid recontamination of the oral cavities by bacteria which tend to attack the surfaces of teeth or by other bacteria which tend to create sicknesses typical of the throat and other oral cavities.

Aseptic containers 44 can be individually dispensed or can be connected in a series as illustrated in FIGS. 16 and 17 where five separate packages are shown connected. The individual packages 44 may simply be separated from the series of packages by breaking the scoreline 46 to remove a aseptic package 44 when a user is prepared to use the toothbrush packaged in the container 44.

A final feature of the invention is illustrated in FIG. 16 of the drawings in which head 21 having bristles 39 is illustrated in an enlarged view. In a preferred embodiment of the invention, bristles 39 are coated by a dentifrice 54 so that the user of the brush has no need to apply a dentifrice to the brush 22 prior to use. Again, the application of a dentifrice 54 to the bristles 39 enhances the aseptic nature of the head since the dentifrice 54 is packaged along with the head 21 in the aseptic container 44. Thus, it will be apparent that such packaging permits the user of the brush or head 21 to insert handle 32 into the brush 21 and begin to brush the teeth without ever having to apply dentifrice to the bristles or to touch the brush with hands which may be contaminated. Further, the disposable brush 21 permits discard of the brush along with any contaminants or bacterial agents which may be present in the mouth.

The use of a male extension 31 in combination with a female receptor or socket 24 also permits handle 32 to be completely sterilized. The socket 24 or female receptor is the area which would be most likely to collect contaminants and other debris picked up during the brushing operation. This female receptor 24 is discarded along with the head 21. The male extension 31 on the other hand, is fully exposed and can easily be cleaned by the user of the device. All surfaces of the male extension 31 and handle 32 are fully exposed for flushing, brushing or other sterilization procedures in the event that might be necessary. There are no cavities or openings which will tend to become clogged with debris and thus produce a septic device.

The above-described embodiments and preferred embodiments of the invention and there are many variations of the invention which might be practiced but which are within the spirit and scope of the principles described.

What is claimed is:

1. An oral hygiene system comprising a disposable head, an aseptic container for storing the head and a handle for penetrating said container and engaging said head,
   a. Said disposable head comprising a body portion having an oral hygiene applicator and an end portion having a socket, said socket having a generally annular groove,
   b. Said aseptic container enclosing said head and with the head positioned within said container with said applicator near a first end of said container and the socket positioned near a receiving end, said container having a scored cover over said receiving end for aseptically sealing said head in said container, and
   c. Said handle comprising a free end for grasping by a user, and an operating end having a pointed male extension for penetrating said scored cover and engaging said socket, said pointed male extension having a generally annular projection for engaging said annular groove to lock said handle to said head in a snap-fit arrangement.

2. A system in accordance with claim 1 wherein said socket is in the general shape of a cone and the pointed male extension is in the general shape of a cone with the pointed end of the cone engaging said scored cover to penetrate the cover and for engaging the cone-shaped socket to lock said handle to said head.

3. A system in accordance with claim 1 in which said applicator is a dental brush having bristles for cleaning teeth.

4. A system in accordance with claim 3 in which said brush has dentifrice on the surface of the bristles.

5. A system in accordance with claim 1 in which said scored cover is scored by at least two intersecting score lines which intersect at a point generally adjacent the location of said socket.

6. An oral hygiene device comprising a handle and a disposable head into which the handle may be inserted to form a functional device,
   a. said disposable head comprising a body portion having an oral hygiene applicator and an end portion having a socket, said socket having a generally annular groove,
   b. said handle comprising a free end for grasping by a user and an operating end having a pointed male extension for engaging said socket, said pointed male extension having a generally annular projection for engaging said annular groove to lock said handle to said head in a snap-fit arrangement.

7. A device in accordance with claim 6 wherein said socket is the general shape of a cone and the pointed male extension is the general shape of a cone to engage said socket in a friction fit.

8. A device in accordance with claim 7 in which said applicator is a dental brush having bristles and in which said brush has a dentifrice applied to said brush.

9. A device in accordance with claim 6 wherein said socket has walls with serrations along the length of the wall and said male extension has at least one fin extending along at least a portion of the length of said extension for engaging said serrations to prevent rotational movement between said handle and said head.

10. A device in accordance with claim 9 in which said fin is located between a point on said pointed male extension and said annular projection.

11. A device in accordance with claim 6 in which said socket has walls with serrations along the length of the wall and said male extension has multiple fins extending along a least portion of the length of said extension for engaging said serration to prevent rotational movement between said handle and said head.

12. A device in accordance with claim 11 in which said socket is the general shape of a cone and the pointed male extension is the general shape of a cone and in which said fins are equally spaced about the surface of the pointed male extension.

13. A device in accordance with claim 11 in which said applicator is a dental brush having bristles for cleaning teeth.

14. A device in accordance with claim 13 in which said brush has a dentifrice applied to said brush.

15. A device in accordance with claim 13 in which said dentifrice is applied along the bristles of said brush.

* * * * *